United States Patent Office 2,861,057

Patented Nov. 18, 1958

2,861,057

3- AND 4-(α-CYANOCINNAMIDO) PHTHALATES OF HYDROXYL-CONTAINING POLYMERS

Stewart H. Merrill and Donald A. Smith, Rochester, N. Y., assignors to Eastman Kodak Company, Rochester, N. Y., a corporation of New Jersey No Drawing. Application December 17, 1956
Serial No. 628,514

12 Claims. (Cl. 260—78.4)

This invention relates to light-sensitive 3- and 4-(α-cyanocinnamido) phthlates of hydroxyl-containing polymers, and to a process for their preparation.

Polymers which contain the cinnamoyl or related groups have been shown to be sensitive to light, becoming insoluble after sufficient exposure. For example, L. M. Minsk et al., in U. S. Patent 2,610,120, dated September 9, 1952, show that polyvinyl cinnamates can be utilized for making light-sensitive compositions adapted for the production of resist images for printing plates. The above polyvinyl cinnamates in the absence of sensitizers have, however, a relatively low order of sensitivity. Others, such as polyvinyl chalcone, can be dissolved only by organic solvents. Still other highly sensitive polymers are difficult to prepare or are unstable on keeping or storage. It would, therefore, be very desirable to provide materials having both high sensitivity and improved solubility in aqueous solvents. We have now found that 3- or 4-(α-cyanocinnamido) phthalate derivatives of hydroxyl-containing polymers undergo insolubilization on exposure to light, having speeds without added sensitizers up to about 6000 times that of unsensitized polyvinyl cinnamate, and that these polymeric derivatives have the added advantage of being readily soluble in aqueous solvents, thereby enhancing their value for commercial reproduction applications.

It is, accordingly, an object of the invention to provide a new class of resinous polymers. A further object is to provide compositions which are light-sensitive and particularly useful for photomechanical reproduction processes. Another object is to provide a process for preparing the new class of polymers and materials containing the same. Other objects will become apparent from the description and examples herein.

The new class of polymeric compounds of our invention are characterized by containing attached to a carbon of a polymer the recurring 3- or 4-(α-cyanocinnamido) phthalate unit having the structure:

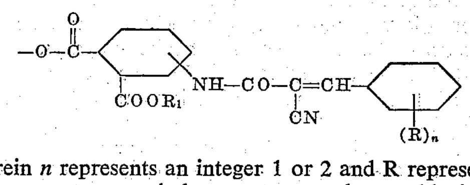

wherein $n$ represents an integer 1 or 2 and R represents a hydrogen atom, a halogen atom such as chlorine or bromine, a hydroxyl group, a methylene dioxy group, an alkyl group containing from 1 to 4 carbon atoms e. g. methyl, ethyl, propyl, isopropyl, butyl, etc. groups, an alkoxy group containing from 1 to 4 carbon atoms e. g. methoxy, ethoxy, propoxy, butoxy, etc. groups, an acetamido group, a —$COOR_1$ group, an —$SO_3R_1$ group and a —$NR_2R_2$ group, $R_1$ represents a hydrogen atom or an alkali metal atom e. g. sodium or potassium and $R_2$ represents an alkyl group containing from 1 to 4 carbon atoms. For example, the polymers of our invention such as those where the starting polymeric material is polyvinyl alcohol comprise the recurring vinyl 3- or 4-(α-cyanocinnamido) phthalate unit

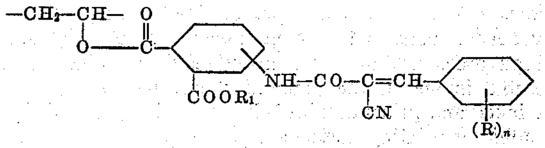

wherein $n$, R and $R_1$ are as above defined, and in some cases may also contain some residual unreacted vinyl alcohol units; those where the starting polymeric material is a partially hydrolyzed polyvinyl ester such as partially hydrolyzed polyvinyl acetate comprise the characteristic recurring vinyl 3- or 4-(α-cyanocinnamido) phthalate group and the recurring vinyl acetate unit

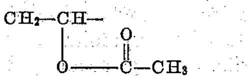

and in some cases may also contain some residual unreacted vinyl alcohol units. The carbohydrate type of polymers including partially hydrolyzed cellulose acetate, hydroxyethylcellulose, etc. of the invention similarly contain the 3- or 4-(α-cyanocinnamido) phthalate unit by esterification of hydroxyl groups on the polymer, and depending on the starting polymer may also contain other ester and ether groups, as well as some unreacted hydroxyl groups where the reaction by our process has been carried out only to partially complete esterification. For example, polyvinyl alcohol, with or without residual acetate groups, esterified with as little as 5 mole percent (equivalent to about 30% by weight of the esterified polymer) of 3- or 4-(α-cyanocinnamido) phthalate units gives a light-sensitive usable product. The unreacted vinyl alcohol units in such products may be further esterified with dibasic anhydrides such as phthalic or succinic anhydride to increase the solubility of the polymer in water. Polyvinyl alcohol can also be essentially completely esterified with 3- or 4-(α-cyanocinnamido) phthalate as the upper limit of utility for making resist images. In general, the higher the cyanocinnamido phthalate group content in the polymer, the greater is its sensitivity. The polymers prepared by reacting 3-(p-methoxy-α-cyanocinnamido) phthalic anhydride with partially hydrolyzed polyvinyl acetate are outstanding and are preferred.

The above-defined light-sensitive polymers of the invention may be prepared by esterifying a hydroxyl-containing polymer, i. e. polymers containing at least one functional hydroxyl group, with a 3- or 4-(α-cyanocinnamido) phthalic anhydride represented by the following general formula:

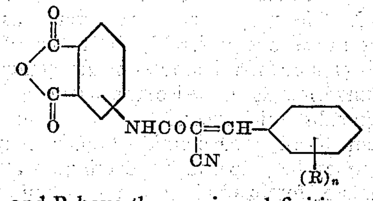

wherein $n$ and R have the previous definitions, by heating a mixture of the above components at from about 70°–110° C., in the proportions of about from 0.05 to 2.0 moles (e. g. gram-molecular weights), and even more, of the said anhydride to each mole of the said hydroxyl-containing polymer, preferably in an inert solvent medium such as pyridine, dimethyl formamide, dioxane, etc., and then precipitating the product by pouring the reaction mixture into vigorously agitated water containing a small amount of a strong acid, preferably hydrochloric acid, washing the precipitated product and drying. The dried product can then be dissolved in an aqueous mixture such as aqueous ammonia and ethanol and the solution coated on a lithographic surface such as surface hydrolyzed cellulose organic ester sheet e. g. surface hydrolyzed cellulose acetate, casein, a metal foil or sheet e. g. zinc, aluminum, copper, magnesium and various alloys thereof, and the like, exposed after drying to ultraviolet light through a negative or line drawing, followed by development in the same solvent whereby the unexposed areas are dissolved away leaving behind an insoluble image in the exposed areas, which latter can be inked and prints obtained therefrom by standard lithographic or printing methods.

Typical hydroxyl-containing starting polymers in the above process include partially or completely hydrolyzed polyvinyl esters such as partially hydrolyzed polyvinyl acetate, polyvinyl propionate, polyvinyl butyrate, polyvinyl alcohol, etc., partially or completely hydrolyzed copolymers of a vinyl carboxylic ester such as hydrolyzed copolymers of vinyl acetate with ethylene, of vinyl acetate with vinyl chloride, of vinyl acetate with vinyl ethyl ether, of vinyl acetate with acrylonitrile, of vinyl acetate with methacrylonitrile, of vinyl acetate with acrylic or methacrylic acid, of vinyl butyrate with ethylene, etc., starch, guar, cellulose, cellulose derivatives such as partially esterified or etherified cellulose e. g. cellulose acetate, cellulose propionate, cellulose butyrate, cellulose acetate-propionate, cellulose acetate-butyrate, cellulose ethyl ether, cellulose methyl ether, etc. hydroxyalkyl celluloses such as β-hydroxyethyl cellulose, and the like.

The intermediate 3- and 4-(α-cyanocinnamido) phthalic anhydrides may be prepared by reacting a 3- or 4-α-cyanoamido-phthalic anhydride represented by the general formula:

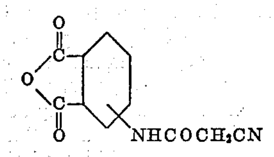

with an aromatic aldehyde represented by the general formula:

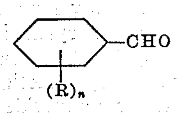

wherein *n* and R have the previously given definitions, in the presence of a tertiary amine such as trimethylamine, triethylamine, quinoline, pyridine, etc., at about 30°–50° C., filtering off the crystalline product which forms, washing and recrystallizing from an alkanol solution such as ethanol, methanol, etc. The free acid product thus obtained is then converted to the corresponding anhydride by treatment with acetic anhydride at about 90°–110° C. The proportions of the reactants can vary over a wide range, but preferably the moles of aldehyde employed is greater than the moles of the cyanoacetamido phthalic anhydride used. Also the acetic anhydride is employed in substantial excess.

The 3- and 4-α-cyanoacetamidophthalic anhydride intermediates may be prepared by reacting an alkali metal aminophthalate, for example, sodium 3- aminophthalate or a dialkyl ester of aminophthalic acid with cyanoacetic acid and converting the resulting α-cyanoacetamidophthalic acid to the corresponding anhydride by treatment with acetic anhydride and separating the crystalline anhydride product from the reaction mixture. Further details for the preparation of the 3- and 4-α-cyanoacetamidophthalic anhydrides employed in the invention may be had by reference to copending application Serial No. 628,507, of D. A. Smith, filed of even date herewith, which describes and claims the said anhydrides.

Typical aromatic aldehydes coming with the preceding definition of suitable aldehydes for preparing the intermediate 3- and 4-(α-cyanocinnamido) phthalic anhydrides of the invention include benzaldehyde, monoalkyl substituted benzaldehydes such as o-tolualdehyde, m-tolualdehyde, p-tolualdehyde, and corresponding ethyl-, propyl- and butyl-benzaldehydes, dialkyl substituted benzaldehydes such as 2,5-dimethyl-benzaldehyde, 3,5-dimethyl-benzaldehyde, 2,6-dimethyl-benzaldehyde, and corresponding diethyl-, dipropyl- and dibutyl-benzaldehydes, monoalkoxy substituted benzaldehydes such as m-methoxy-benzaldehyde, o-methoxy-benzaldehyde, etc. and corresponding ethoxy-, propoxy- and butoxy- benzoldehydes, dialkoxy substituted benzaldehydes such as 3,4-dimethoxy-benzaldehyde, 2,5 - dimethoxy - benzaldehyde, etc. and corresponding diethoxydipropoxy- and dibutoxy-benzaldehydes, the mono- and di-hydroxy benzaldehydes, vanillin, isovanillin, piperonal, the carboxybenzaldehydes such as o-aldehydo-benzoic acid, p-aldehydo-benzoic acid, etc. and sodium and potassium salts thereof, the sulfobenzaldehydes such as benzaldehyde-m-sulphonic acid, benzaldehyde-o-sulphonic acid, etc., and sodium and potassium salts thereof, acetamido-benzaldehydes such as p-acetamidobenzaldehyde, etc. and amino-benzaldehydes such as p-dimethyl- and p-diethyl-amino-benzaldehydes, and the like. Other aromatic aldehydes which can also be employed include 1-naphthaldehyde, 2-naphthaldehyde, 9-anthraldehyde, 1,8-naphthaldehydic acid, etc.

The invention is further illustrated by the following examples of certain advantageous embodiments thereof.

*Example 1.—3-(α-cyanocinnamido) phthalic anhydride*

46 g. (0.20 mol.) of 3-cyanoacetamidophthalic anhydride were dissolved in 80 cc. of pyridine with gentle stirring. To this solution, there were added 27 g. (0.26 mol.) of benzaldehyde and 1 g. of trimethylamine, and the mixture was heated at 40° C. for 24 hours, during which time the contents of the flask became nearly solid. The cake was broken up in 200 cc. of water. Following filtration, the solid was acidified with dilute hydrochloric acid, the insoluble free acid product was filtered out, washed with water and recrystallized from ethanol.

The above acid product was then heated at 95°–100° C. in 100 cc. of acetic anhydride. A yield of 35 g. of the crystalline 3-(α-cyanocinnamido) phthalic anhydride, M. P. 265° C., was recovered and washed with carbon tetrachloride. A sample thereof was recrystallized from dioxane for analysis. It contained by weight 67.6% of carbon, 3.6% of hydrogen and 8.5% of nitrogen compared with calculated values for $C_{18}H_{10}O_4N_2$ of 68.0%, 3.2% and 8.8%, respectively.

*Example 2.—3-(p-methoxy-α-cyanocinnamido) phthalic anhydride*

The above compound, M. P. 268°–271° C., was prepared in a manner identical to that described in Example 1, by substituting p-methoxybenzaldehyde (anisaldehyde) for the benzaldehyde. A sample of the anhydride was reconverted to the acid by warming in the aqueous pyridine. Analysis of the acid showed that it contained by weights 62.8% of carbon, 3.7% of hydrogen and 8.1% of nitrogen compared with calculated values for $C_{19}H_{14}O_6N_2$ of 62.4%, 3.8% and 7.7%, respectively, indicating thereby that the above indicated anhydride had been obtained in substantially pure form.

*Example 3.—3-(p-chloro-α-cyanocinnamido) phthalic anhydride*

The above compound, was prepared by the same method described in Example 1, except that the p-chloro derivative (p-chloro-benzaldehyde) was used in place of the benzaldehyde. After recrystallization from dioxane, it melted at 268°–270° C. Analysis of the anhydride showed that it contained by weight 61.1% of carbon, 2.5% of hydrogen, 8.3% of nitrogen and 10.4% of chlorine compared with calculated values for $$C_{18}H_9O_4N_2Cl$$

of 61.3%, 3.9%, 7.9% and 10.1%, respectively.

*Example 4.—3-(α-cyanocinnamido) phthalate of partially hydrolyzed polyvinyl acetate*

A solution of 6 g. of about 88% hydrolyzed polyvinyl acetate and 0.5 g. of anhydrous sodium aceate in 100 cc. of dimethylformamide was prepared by heating the mixture to 140° C., with stirring. To the solution at 90° C., there were added 14 g. of 3-(α-cyanocinnamido) phthalic anhydride, and the mixture was stirred at 95°–100° C., for 4 hours. After cooling overnight, the solution was diluted with an equal volume of dioxane, and the polymer was precipitated by pouring the solution into vigorously agitated water containing a small amount of hydrochloric acid. Following several washes in water, the product was dried in vacuo. A yield of 18 g. of polymer product was obtained, indicating thereby that substantially all of the anhydride had reacted with vinyl alcohol units to form ester units therewith. It contained approximately 52 mole percent of unreacted vinyl alcohol units, 12 mole percent of residual vinyl acetate units and 36 mole percent (equiv. to about 80% by weight) of recurring vinyl-3-(α-cyanocinnamido) phthalate units represented by the structure

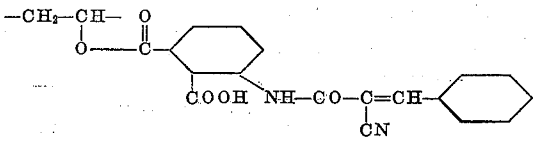

A 2% solution of the above polymer product in equal parts of 0.5% aqueous ammonia and ethanol was coated on a hydrophilic lithographic surface and exposed, after drying, to ultraviolet light through a negative. Following development in the same solvent, the plate now containing the positive resist image was inked and printed on paper. A clear positive image corresponding to the negative was obtained.

*Example 5.—3-(p-methoxy-α-cyanocinnamido) phthalate of partially hydrolyzed polyvinyl acetate*

A. A solution of 6 g. of approximately 88% hydrolyzed polyvinyl acetate and 0.5 g. of sodium acetate was heated with 15 g. of 3-(p-methoxy-α-cyanocinnamido) phthalic anhydride in the manner described in Example 4. A yield of 18 g. of polymer product was obtained indicating thereby that substantially all of the anhydride had reacted with vinyl alcohol units to form ester units therewith. It contained approximately 52 mole percent of unreacted vinyl alcohol units, 12 molt percent of residual vinyl acetate units and 36 mole percent (equiv. to about 81% by weight) of recurring vinyl - 3 - (p-methoxy-α-cyanocinnamido) phthalate units represented by the structure

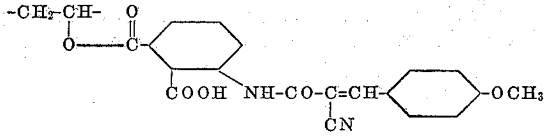

When the above polymer product was coated from a 2% solution thereof in equal parts of 0.5% aqueous ammonia and ethanol, exposed and developed in the same solvent, the measured sensitivity showed an unsensitized speed factor of 5500 (expressed as a glass factor) compared with a speed factor of unity under the same test conditions for unsensitized polyvinyl cinnamate.

B. A solution of 6 g. of about 88% hydrolyzed polyvinyl acetate was esterified with 3.7 g. of 3-(p-methoxy-α-cyanocinnamido) phthalic anhydride by the procedure of Example 4. The resulting polymer product contained approximately 78 mole percent of unreacted vinyl alcohol units, 13 mole percent of residual vinyl acetate units and 9 mole percent (equiv. to about 43% by weight) of recurring vinyl-3-(p-methoxy-α-cyanocinnamido) phthalate units. On testing the sensitivity in the manner described in above Example 5A, it showed an unsensitized speed factor through glass of 900 compared to a speed factor of unity for unsensitized polyvinyl cinnamate under exactly the same test conditions.

C. The polymer product of above Example 5B was modified by adding to the reaction mixture, without isolation of the polymer, 8 g. of phthalic anhydride, and continuing the heating at 95°–100° C. for an additional 2.5 hours. This final esterified product was isolated by precipitation in water. The product was completely soluble in 0.5% aqueous ammonia. On coating this solution and testing the sensitivity, the dried coating showed an unsensitized speed factor through glass of 5500 compared with a speed of unity for unsensitized polyvinyl cinnamate under exactly the same testing conditions.

In place of the 88% hydrolyzed polyvinyl acetate, there may be substituted in the above Examples 5A and 5B a like amount of any other partially or completely hydrolyzed polyvinyl acetate, i. e., polyvinyl alcohol, to give generally similar light sensitive polymer products. Also, the anhydride may be used in such amount as to ensure the esterification of all of the available vinyl alcohol units. This modification makes possible the production of polymers that are essentially binary copolymers of vinyl acetate or vinyl alcohol with vinyl-3-(p-methoxy-α-cyanocinnamido) phthalate, or essentially the homopolymer polyvinyl - 3 - (p - methoxy - α - cyanocinnamido) phthalate. The latter polymer products also exhibit enhanced sensitivity as compared with polyvinyl cinnamate under exactly the same test conditions.

*Example 6.—3-(p-chloro-α-cyanocinnamido) phthalate of partially hydrolyzed polyvinyl acetate*

15 g. of 3-(p-chloro-α-cyanocinnamido) phthalic anhydride were esterified with 6 g. of about 88% hydrolyzed polyvinyl acetate following the procedure of Example 4. The polymer product was characterized by containing the recurring structural unit vinyl 3-(p-chloro-α-cyanocinnamido) phthalate unit

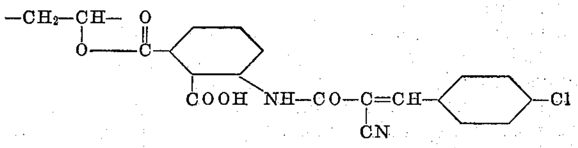

in an amount of approximately 81% by weight of the polymer, the remainder of the polymer being unreacted vinyl alcohol units and residual vinyl acetate units. The polymer product also exhibited enhanced sensitivity over polyvinyl cinnamate under the same test conditions.

*Example 7.—3-(p-methoxy-α-cyanocinnamido) phthalate of partially hydrolyzed cellulose acetate*

To a solution of 4.5 g. of partially hydrolyzed cellulose acetate (acetyl content—32.4% by weight) in 50 cc. of pyridine, there were added 8 g. of 3-(p-methoxy-α-cyanocinnamido) phthalic anhydride and the mixture heated at 90°–95° C. for a period of 4 hours. The cooled solution was poured into vigorously agitated acetone to precipitate the product. Additional quantities of acetone were employed to wash the polymer. All of the available hydroxyl groups in the hydrolyzed cellulose acetate were believed fully esterified with the said anhydride. The product was dissolved in methoxyethanol and on coating and drying, exposing and developing with the same solvent gave a clear resist image that was receptive to printing inks and from which excellent printed reproductions were obtainable. The cellulose product was believed to contain the recurring unit represented by the general structure

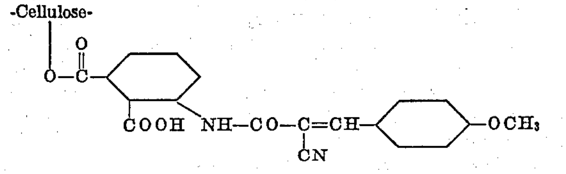

wherein the cellulose unit may also contain some residual acetate(—$OCOCH_3$) groups.

*Example 8.—3-(p-methoxy-α-cyanocinnamido) phthalate of hydroxyethylcellulose*

3.8 g. of hydroxyethylcellulose were swollen in 55 cc. of pyridine by heating the mixture at 90°–95° C., with stirring, and then 17 g. of 3-(p-methoxy-α-cyanocinnamido) phthalic anhydride were added. After stirring and heating for 5 hours, the solution was poured into acetone to precipitate the polymer product. All of the available hydroxyl groups in the hydroxyethylcellulose were believed fully esterified with the said anhydride. When the polymer was coated from tetrahydrofurfuryl alcohol, dried, exposed and developed, it gave a clear resist image that was receptive to printing inks and provided good printed reproductions thereof. The coated product on testing for sensitivity showed an unsensitized speed factor through glass of 3500 compared with a speed factor of unity for unsensitized polyvinyl cinnamate under exactly the same test conditions.

The preparation of coatings and the relative sensitivities were determined in the preceding examples by coating the polymer product of each example in uniform thickness on a paper base no sensitizers being added. To determine the sensitivity of the coated papers, each sample was exposed beneath a density step wedge through a ¼-inch of clear, colorless glass. The exposed samples were then developed in the indicated solvent which left in each instance insolubilized polymer (forming the image) in proportion to the degree of exposure. The developed samples were dyed and inked by a standard procedure and the densities of the step wedge producing the last visible insolubilized image were read and the relative speeds calculated. The overall sensitivities are given in terms of a speed factor as compared with a value of 1.0 for unsensitized polyvinyl cinnamate check samples, coated, exposed and developed simultaneously under exactly the same conditions in an appropriate solvent therefor. The cellulose product was believed to consist of the recurring unit represented by the general structure

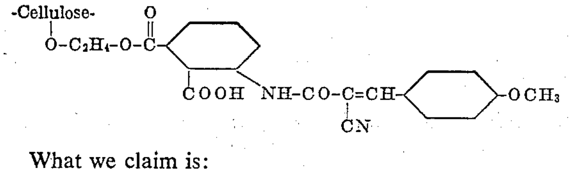

What we claim is:

1. A resinous polymer selected from the group consisting of (1) a vinyl polymer consisting of at least 30% by weight of the recurring general structural unit:

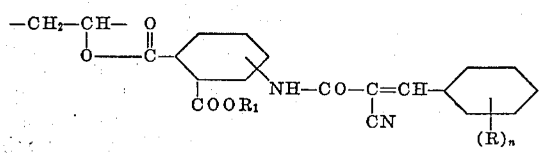

wherein n represents an integer of from 1 to 2 and R represents a member selected from the group consisting of a hydrogen atom, a chlorine atom, a bromine atom, an alkyl group of 1 to 4 carbon atoms, an alkoxy group of 1 to 4 carbon atoms, an acetamido group, a —$COOR_1$ group, an —$SO_3R_1$ group and an

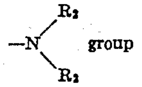

and wherein in each instance $R_1$ represents a member selected from the group consisting of a hydrogen atom and an alkali metal atom and $R_2$ represents an alkyl group of 1 to 4 carbon atoms, the remainder of the polymer molecule to make a total of 100% being composed of residual recurring structural units selected from the group consisting of a vinyl alcohol unit, a vinyl ester of a saturated monobasic fatty acid of 2 to 4 carbon atoms unit, and vinyl alcohol and said vinyl ester units in linear combination, (2) a cellulose ester consisting of at least 30% by weight of the recurring general structural unit:

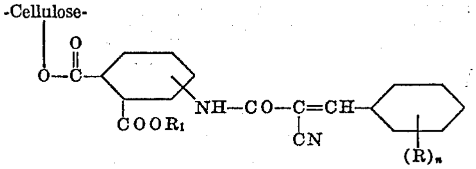

wherein *n*, R and $R_1$ are as above defined, the remainder of the cellulose ester molecule to make a total of 100% being cellulose acetate units, and (3) a cellulose ether consisting of at least 30% by weight of the recurring general structural unit:

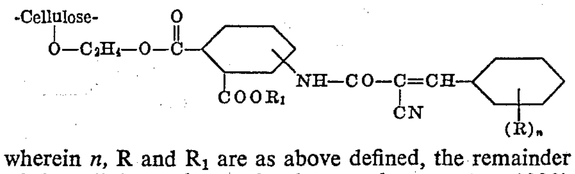

wherein *n*, R and $R_1$ are as above defined, the remainder of the cellulose ether molecule to make a total of 100% being hydroxyethylcellulose units.

2. A resinous vinyl polymer consisting of at least 30% by weight of recurring 3-(α-cyanocinnamido) phthalate units, the remainder of the polymer molecule to make a total of 100% being residual recurring vinyl alcohol and vinyl acetate units.

3. A resinous vinyl polymer consisting of at least 30% by weight of recurring 3-(p-methoxy-α-cyanocinnamido) phthalate units, the remainder of the polymer molecule to make a total of 100% being residual recurring vinyl alcohol and vinyl acetate units.

4. A resinous vinyl polymer consisting of at least 30% by weight of recurring 3-(p-chloro-α-cyanocinnamido) phthalate units, the remainder of the polymer molecule to make a total of 100% being residual recurring vinyl alcohol and vinyl acetate units.

5. A cellulose ester consisting of at least 30% by weight of recurring cellulose 3-(p-methoxy-α-cyanocinnamido) phthalate units, the remainder of the cellulose ester molecule to make a total of 100% being residual recurring cellulose acetate units.

6. A cellulose ether consisting of at least 30% by weight of the recurring unit represented by the structure:

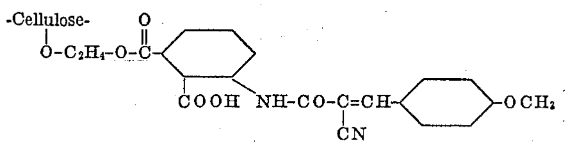

the remainder of the cellulose ether molecule to make a total of 100% being residual recurring hydroxyethylcellulose units.

7. A process for preparing a resinous polymer which comprises heating a resinous hydroxyl-containing polymer selected from the group consisting of polyvinyl alcohol, a copolymer consisting of at least 5 mole percent of vinyl alcohol and the remainder of a vinyl ester of a saturated monobasic fatty acid of 2 to 4 carbon atoms, a cellulose acetate containing free hydroxyl groups and a hydroxyethylcellulose with an (α-cyanocinnamido) phthalic anhydride represented by the following general formula:

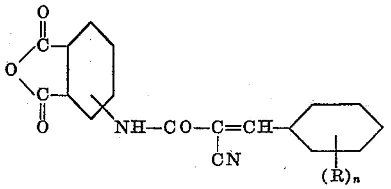

wherein $n$ represents an integer of from 1 to 2 and R represents a member selected from the group consisting of a hydrogen atom, a chlorine atom, a bromine atom, an alkyl group of 1 to 4 carbon atoms, an alkoxy group of 1 to 4 carbon atoms, an acetamido group, a $—COOR_1$ group, an $—SO_3R_1$ group and an

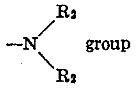

and wherein in each instance $R_1$ represents a member selected from the group consisting of a hydrogen atom and an alkali metal atom and $R_2$ represents an alkyl group of 1 to 4 carbon atoms, at a temperature of 70–110° C., in the proportions of from 0.05 to 2.0 moles of the said anhydride to each mole of the said resinous hydroxyl-containing polymer.

8. A process for preparing a resinous vinyl polymer consisting of at least 30% by weight of recurring 3-(α-cyanocinnamido) phthalate units, the remainder of the polymer molecule being residual recurring vinyl alcohol and vinyl acetate units, which comprises heating a resinous copolymer consisting of vinyl alcohol and the remainder of vinyl acetate with 3-(α-cyanocinnamido) phthalic anhydride, at a temperature of 70–110° C., in the proportions of from 0.05 to 2.0 moles of the said anyhydride to each mole of the said resinous copolymer.

9. A process for preparing a resinous vinyl polymer consisting of at least 30% by weight of recurring 3-(p-methoxy-α-cyanocinnamido) phthalate units, the remainder of the polymer molecule being residual recurring vinyl alcohol and vinyl acetate units, which comprises heating a resinous copolymer consisting of vinyl alcohol and the remainder of vinyl acetate with 3-(p-methoxy-α-cyanocinnamido) phthalic anyhydride, at a temperature of 70–110° C., in the proportions of from 0.05 to 2.0 moles of the said anhydride to each mole of the said resinous copolymer.

10. A process for preparing a resinous vinyl polymer consisting of at least 30% by weight of recurring 3-(p-chloro-α-cyanocinnamido) phthalate units, the remainder of the polymer molecule being residual recurring vinyl alcohol and vinyl acetate units, which comprises heating a resinous copolymer consisting of vinyl alcohol and the remainder of vinyl acetate with 3-(p-chloro-α-cyanocinnamido) phthalic anhydride, at a temperature of 70–110° C., in the proportions of from 0.05 to 2.0 moles of the said anhydride to each mole of the said resinous copolymer.

11. A process for preparing a cellulose ester consisting of at least 30% by weight of recurring cellulose 3-(p-methoxy-α-cyanocinnamido) phthalate units, the remainder of the cellulose ester molecule to make a total of 100% being residual recurring cellulose acetate units, which comprises heating a cellulose acetate containing free hydroxyl groups with 3-(p-methoxy-α-cyanocinnamido) phthalic anhydride, at a temperature of 70–110° C., in the proportions of from 0.05 to 2.0 moles of the said anhydride to each mole of the said cellulose acetate containing free hydroxyl groups.

12. A process for preparing a cellulose ether consisting of at least 30% by weight of the recurring unit represented by the structure:

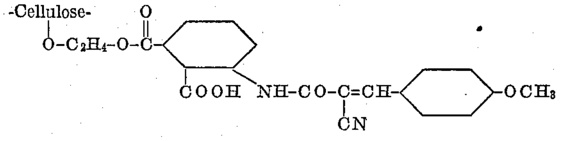

the remainder of the cellulose ether molecule to make a total of 100% being residual recurring hydroxyethylcellulose units, which comprises heating a hydroxyethylcellulose with 3-(p-methoxy-α-cyanocinnamido) phthalic anhydride, at a temperature of 70–110° C., in the proportions of from 0.05 to 2.0 moles of the said anhydride to each mole of the said hydroxyethylcellulose.

No references cited.